United States Patent [19]

Platt, Jr. et al.

[11] Patent Number: 4,472,450
[45] Date of Patent: Sep. 18, 1984

[54] REMOVING WATER FROM HONEY AT AMBIENT PRESSURE

[75] Inventors: James L. Platt, Jr., Novato; John R. B. Ellis, Kentfield, both of Calif.

[73] Assignee: Chevron Research Company, San Francisco, Calif.

[21] Appl. No.: 456,115

[22] Filed: Jan. 6, 1983

[51] Int. Cl.$^3$ .............................................. A23G 3/00
[52] U.S. Cl. .................................. 426/658; 426/474; 426/312; 127/16; 127/58; 127/61
[58] Field of Search ............... 426/465, 471, 492, 658, 426/660, 474; 127/16, 58, 61

[56] References Cited

U.S. PATENT DOCUMENTS

| 469,058 | 2/1882 | Currier | 127/16 |
|---|---|---|---|
| 1,096,193 | 5/1914 | Prager | |
| 1,890,632 | 12/1932 | Walsh | 127/16 |
| 2,160,533 | 5/1939 | Bonath | 127/16 |
| 2,248,867 | 7/1941 | Hallman, Sr. | 219/400 |
| 2,621,128 | 12/1952 | Webb et al. | 426/658 |
| 2,906,630 | 9/1959 | Turkot | 426/658 |
| 3,018,559 | 1/1962 | Dorsey | 426/465 |
| 3,103,439 | 9/1963 | Williams | 426/471 |
| 3,349,827 | 10/1967 | Vincent | 426/465 |
| 3,388,733 | 6/1968 | Jächering | 426/471 |
| 3,483,032 | 12/1969 | Stern et al. | 127/58 |
| 3,642,535 | 2/1972 | Graham et al. | 426/658 |
| 3,655,442 | 4/1972 | Schwer | 127/62 |
| 3,906,114 | 9/1975 | Glabe et al. | 426/641 |
| 3,941,893 | 3/1976 | Glable | 426/658 |
| 3,953,615 | 4/1976 | Gupta | 426/658 |
| 4,050,952 | 9/1977 | Liebl | 426/238 |
| 4,074,751 | 2/1978 | Ducasse | 165/92 |

Primary Examiner—Jeanette M. Hunter
Attorney, Agent, or Firm—Burns, Doane, Swecker & Mathis

[57] ABSTRACT

A method for reducing the water content of honey is disclosed. The method involves rotating a thin film of honey and passing a nonturbulent stream of ambient pressure 40° C. to 75° C. air over said honey to reduce its water content.

9 Claims, 6 Drawing Figures

REMOVING WATER FROM HONEY AT AMBIENT PRESSURE

FIELD OF THE INVENTION

The invention concerns the removal of water from honey. More specifically it concerns a method for removing excess water from honey and an apparatus for effecting the method.

PRIOR ART

Honey is a valuable product which has been produced and used for thousands of years. Honey is a concentrated solution of low molecular weight sugars in water. The actual water content of a particular honey will vary from a minimum of about 15% up to maximum of 30% or greater. This water content will depend on several factors. For one, the water content of honey in uncapped (uncompleted) combs tends to be higher than in capped combs. Another factor relates to the atmosphere in which the honey is stored. Honey is hygroscopic. In hot humid areas such as the gulf coast of the United States of America and the tropical climates of Africa and the far East, it can rapidly pick up water during uncovered storage.

This water pick up can be a serious problem. At water levels below about 18% by weight, honey is capable of suppressing the growth of yeasts and other microbial species. At water levels above about 18% by weight, yeasts can flourish in honey. This causes fermentation and loss of product quality. Therefore, a means for reducing the water content of honey is desirable. This is not a simple task, however. Conventional methods for dewatering sucrose solutions or maple sugar solutions such as evaporating water by boiling or removing water through semipermeable reverse osmosis membranes have major failings when applied to honey dewatering.

The temperature required to boil off the excess water from honey at ambient pressure is above 100° C. At temperatures above about 60° C. honey rapidly degrades—loosing its desired flavor. Membrane processes are hindered by the extreme viscosity of honey which renders them impractically inefficient. Vacuum drying processes in theory might work but have economic and practical problems. Use of expensive, complicated, difficult-to-maintain and difficult-to-power vacuum systems can seldom be justified in less-developed countries.

Patent references concerning the subject matter of this invention include the following:

| Pat. No. | Inventor | Issue Date |
| --- | --- | --- |
| 469,058 | Currier | Feb. 16, 1892 |
| 1,096,193 | Prager | May 12, 1914 |
| 2,160,533 | Bonath | May 30, 1939 |
| 2,248,867 | Hallman, Sr. | July 8, 1941 |
| 3,483,032 | Stern et al | Dec. 9, 1969 |
| 3,906,114 | Glabe et al | Sept. 16, 1975 |
| 4,050,952 | Liebl | Sept. 27, 1977 |
| 4,074,751 | Ducasse | Feb. 21, 1978 |

The Currier, Prager, Bonath and Ducasse patents disclose apparatus for concentrating sugar-like syrups.

The Liebl patent discloses the use of ultrasonic radiation for the prevention of fermentation in honey.

The Stern et al and Glabe et al patents are of more general interest for their disclosures of drying honey after mixing it with corn syrup and soy protein respectively.

The Hallman patent is also of more general interest for its disclosure of a device for liquidfying honey.

STATEMENT OF THE INVENTION

It has now been found that honey is effectively dewatered by the process of contacting it as a thin film with a nonturbulent air stream having a temperature of from 40° C. to 75° C. In another aspect, this invention provides apparatus for effecting this thin film drying. In one embodiment, this apparatus employs a horizontally axelled rotating disc contactor in a chamber through which the required warm air is passed.

BRIEF DESCRIPTION OF THE DRAWINGS

In this specification reference will be made to the accompanying drawings in which:

FIGS. 4 and 5 are cross sections of further alternative embodiments of the contactor; while

DETAILED DESCRIPTION OF THE INVENTION

The present invention is designed to reduce the water content of honey from high levels (e.g. 20 to 35% water) to below about 18% (e.g. 14 to 18%).

The present invention uses a flow of warm air to dry the honey. The temperature of the warm air is higher than ambient, even in tropical climes but also is less than about 75° C., e.g. 40° C. to 75° C. It will be noted that a temperature of 70° C. or so is somewhat above the accepted decomposition temperature for honey. The evaporative cooling which occurs when water is being removed can cool the liquid honey phase and thus avoid decomposition. The usual air temperature employed is from 45° C. to 70° C. with temperatures from 50° C. to 65° C. being preferred.

It is important to note that a temperature of 45° C. assures that the inlet air stream will not be saturated with water vapor no matter how high the ambient humidity. For example, air having 99% humidity at 38° C. is only 73% saturated at 45° C. and is only 35% saturated at 60° C.

The contacting between air and honey is carried out in thin film. If the honey were contacted in bulk, little drying would occur because the extreme viscosity of honey would slow water equilibration throughout the bulk honey and thus permit only effective drying of the surface. Generally, the thin film varies in thickness from about 0.5 to about 5 mm.

The contacting between air and honey is carried out under nonturbulent conditions. The honey can trap air as an emulsion if air is jetted through it or violently stirred through it. Accordingly, the contacting device should be of low-shear design. Preferably the mean velocity of the air phase past the liquid honey phase is less than 5 m/second and more preferably is less than about 2 m/second.

Alternatively, these gentle contacting conditions can be expressed in terms of dryer housing volumes of air fed per minute, upon which basis the air feed rates are from about 5 to 75 liters/liter of dryer volume per minute and preferably from 15 to 45 liters/liter per minute.

Figure 1:
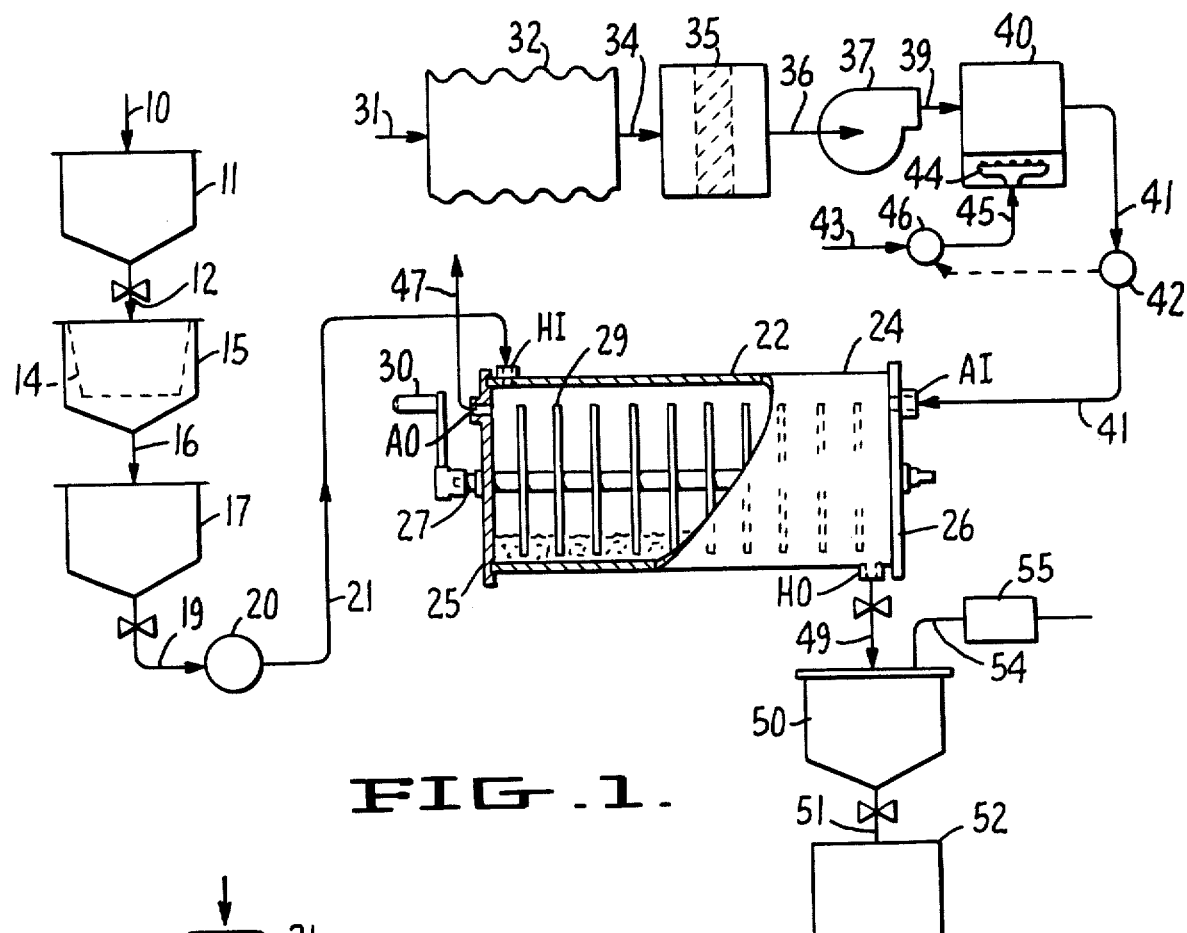
FIG. 1 is a schematic diagram of the process of this invention which shows one form of contacting apparatus in partial cut away.

Such conditions can be achieved in a drying system as is set forth in FIG. 1. In FIG. 1 high moisture honey is charged to storage vessel 11 through line 10. This can be crude honey or filtered honey. If crude it is advantageously filtered to remove bee bodies and comb debris such as by being passed through valved line 12 through basket filter 14 contained in filter holder 15 and then through line 16 to feed vessel 17. The filtered honey in vessel 17 is then fed to the dryer 22. This can be done via valved line 19, pump 20 and line 21 as shown. Pump 20 can be eliminated if desired by mounting the honey feed vessels above dryer 22 and relying upon gravity feed. Drum 22 is shown having an essentially cylindrical housing 24 and end plates 25 and 26. A rotatable axle 27 runs between and is supported by the end plates and carries at least one and preferably a plurality of contactor discs 29a, b, c, d, e, etc. Axle shaft 27 can be mounted in the exact center of housing 24. In the embodiment shown, however, it is mounted closer to the bottom of housing 24 than to the top. Discs 29a etc. are smaller in diameter than the interior diameter of housing 24 and due to the position of axle shaft 27 have a small disc-to-housing clearance, e.g. 1 to 5 mm at the bottom and as much as 5 to 50 mm clearance at the top. This larger clearance at the top permits better air circulation between the discs. Shaft 27 is rotated by means such as manual crank 30 or suitable motor substitute. Shaft 27 rotates at 3 to 20 RPM, and preferably 4 to 15 RPM. Such velocities can be easily achieved manually. High moisture honey is changed to dryer 22 via port HI (Honey Inlet).

Port HI is located in the upper portion of the dryer housing. The honey goes to the bottom of dryer 22 and can fill housing 24 from about 5% to about 45% full. Warm air enters dryer 22 through port AI. Warm air is supplied by a feed system which typically can include inlet duct 31, solar preheat panel 32, transfer duct 34, air filter 35, transfer duct 36, blower 37, transfer duct 39, and heater 40. Heater 40 is controlled so as to yield an air stream in outlet duct 41 having the desired 45°–70° C. as measured by temperature monitor 42. This control can be effected for example by controlling the flow of fuel to heater 44 via conduit 45 and fuel throttle 46. As shaft 27 is turned, honey coats the revolving discs and is contacted with the warm air which removes water. The wet air leaves the dryer via outlet port AO and vent line 47. In practice, it is advisable to terminate vent line 47 some distance from the dryer unit as the wet air is also loaded with honey aroma and thus is of great interest to neighboring bees. The dried honey is removed via outlet port HO aand valved line 49 to covered receiver 50 from which it is in turn withdrawn via valved line 51 to bottling or shipping unit 52. Receiver 50 is vented through vent line 54 equipped with dryer 55 to prevent water contamination of the hygroscopic dried honey.

The system can be operated in a batch mode or a continuous mode. In either manner of operation the feed rate or batch cycle is such as to give adequate drying. Generally a median residence time or batch cycle time of between 1 and 6 hours is called for.

Figure 2:
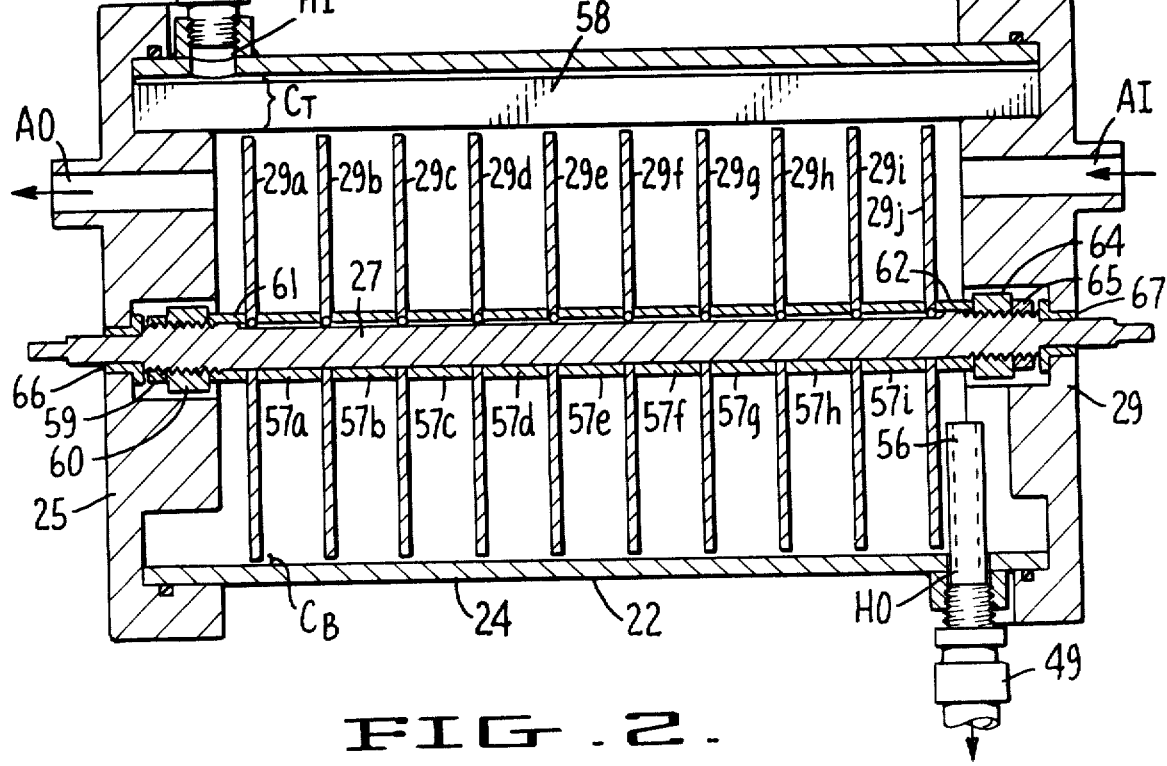
FIG. 2 is a more detailed cross section of a contacting apparatus.

Turning to FIG. 2, a larger scale, cut away view of dryer 22 is shown with body 24, end plates 25 and 26, axle shaft 27, discs 29a, b, etc., port HI, HO, AI and AO and lines 21 and 49 being as described previously. Outlet line 49 is shown equipped with a short standpipe 56 which allows the dryer to remain partially full during operation. As shown, the rotating axle and discs are of a "built up" construction with spacers 57a, 57b, etc. between the discs and end spacers 59, 60 and 61 and 62, 64 and 65 respectively. This built up design permits the contactor to be simply fully dissassembled for cleaning. Axle 27 is supported by bushings 66 and 67. As shown these are fixed in a non central position in plates 25 and 26 so as to give a greater top clearance ($C_T$) than bottom clearance ($C_B$). Alternatively, these bushings could be located in an adjustable housing which would permit $C_B$ to be varied and thus control the rate of flow of honey between the discs and the housing. In the contactor it is desirable to have the air flow over and between the thin honey films on the rotating discs. Ports AI and AO are positioned to enhance this circuitous air flow. The embodiment shown in FIG. 2 is equipped with an air deflector bar 58 which is mounted in the top clearance area of housing 24 to deflect the passing air down between the discs and thus improve the distribution of the air among the several contacting discs.

The contactor shown in FIGS. 1 and 2 can be disassembled by removing the end plates. Alternative designs, such as a fixed end plate, clamshell body design can also be used.

Figure 3:
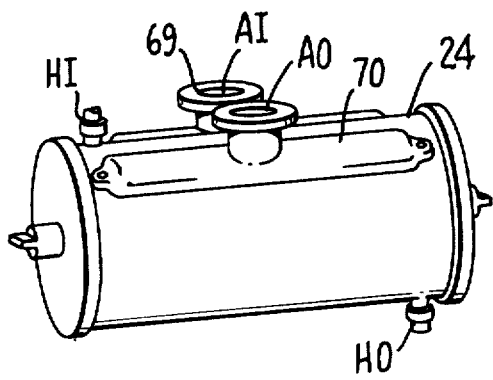
FIG. 3 is a perspective view of an alternative embodiment of the contactor.

FIG. 3 shows a variation of contactor 22. Instead of having the air ports in the end plates, the air inlet is a manifold 69 mounted on housing 24 wth a series of entrance ports spaced along the row of rotary discs. The air outlet is manifold 70 which also communicates with a series of entrance ports spaced along housing 24.

Figure 4:
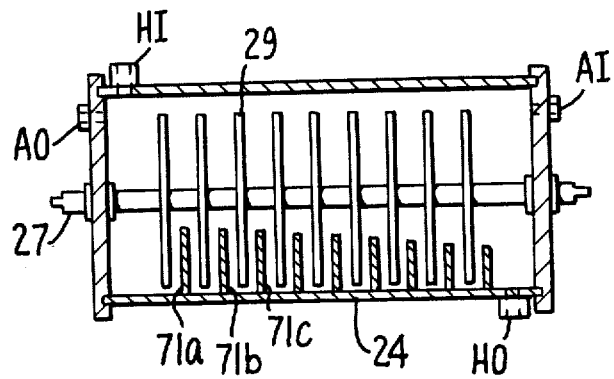
Figure 5:
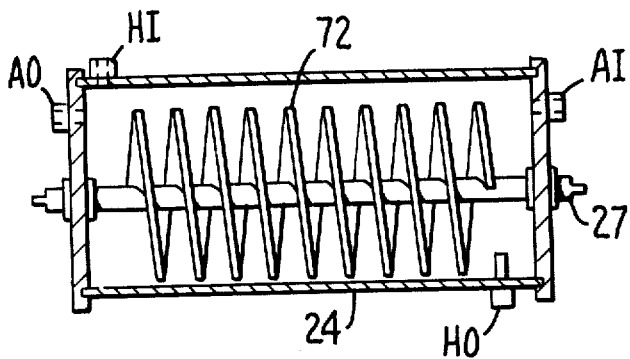

FIGS. 4, and 5 show other exemplary embodiments of the invention. In FIG. 4 a series of wiers 71a, 71b, etc. are employed in between the rotating discs. These weirs restrict the flow of honey through the dryer and provide a series of "stages" of drying. This configuration is preferred for continuous operation while a "no weir" design is more convenient for batch processing.

In FIG. 5 the rotating discs 29a, b, c etc. of FIG. 1 are replaced with a flat surfaced spiral screw 72 which is functionally equivalent and provides a surface for the thin honey film.

The size of the device of this invention is not critical. A 200 liter housing volume unit can be driven manually and can process 25 to 50 kg of honey an hour and thus is attractive for rural settings. A larger size can find use in a central depot area.

The invention is further described by the following Examples: These are presented solely to illustrate the invention and are not to be construed as limiting its scope.

EXAMPLE I

A drying system substantially as shown in FIG. 1 (but not havng a solar preheat and having a motor drive on the contactor) was constructed. The contactor was as shown in FIG. 2 and has an inside diameter of 16.5 cm. The ten discs were 14.5 cm in diameter. $C_B$ is about 2 mm and $C_T$ is about 2 cm. The contactor had an inside length of about 27 cm and the discs were about 2.5 cm apart.

In a batch run, 1468 g of honey having a water content of 26.6% was charged. Air humidified to simulate a tropical environment was heated to 50° C. (at this temperature humidity=27%) and blown at 220 l/minute over the discs which were rotated at 10 RPM. At the end of 2 hours, the water level of the honey was 15.2%.

EXAMPLE II

In a continuous run, weirs were installed in the contactor as shown in FIG. 4. Honey containing 29.6% water was fed at 15.3 to 16.0 ml/minute. Air at 50° C., 27% humidity air in Example I was used. Equilibrium water in the honey product was 16.9%.

EXAMPLE III

Figure 6:
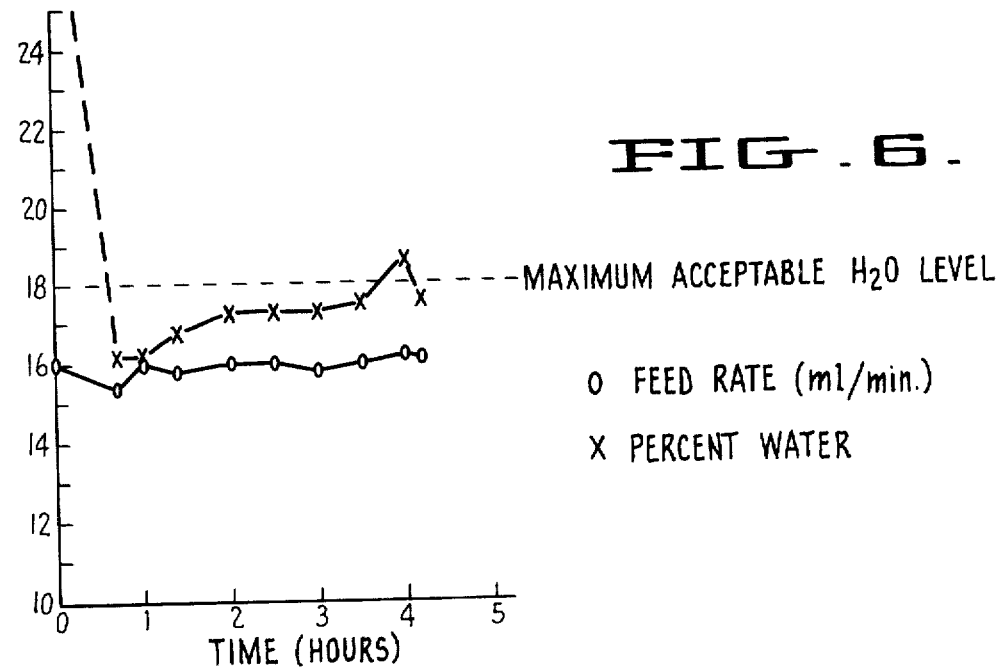
FIG. 6 is a graph illustrating the effectiveness of the present process and apparatus for dewatering honey.

The experiment of Example II was repeated using 62°–63° C. air and a feed rate of about 16 ml/minute. Very promptly, the water level in the product dropped below the 18% maximum. At about 4 hours, the rotation of the discs was inadvertantly halted. Water level in the product rose above the 18% level. When the discs were restarted, the water level dropped to below 18%. The data gathered during that run are presented as a graph in FIG. 6.

What is claimed is:

1. A process for removing water from a feed consisting essentially of wet liquid honey which comprises contacting said honey at ambient pressure as a thin film with a nonturbulent airstream having a temperature of from 40° C. to 75° C., thereby forming dried liquid honey.

2. The process of claim 1 wherein said airstream has a velocity of less than 5 meters per second.

3. The process of claim 1 wherein said thin film is generated by drawing a surface through said honey.

4. The process of claim 3 wherein said thin film is generated by rotating partially immersed vertical discs through said honey.

5. The process of claim 4 wherein said temperature is from 45° C. to 70° C.

6. A process for preparing liquid honey having a water content below 18% by weight from a feed consisting essentially of crude liquid honey containing more than 18% water comprising the steps of:
   (a) filtering said crude honey to remove bee bodies, comb debris and form a filtered honey,
   (b) contacting said filtered honey as a thin film with a nonturbulent stream of atmospheric pressure air having a temperature of from 45° C. to 70° C. for a time sufficient to reduce the water content and form a dried liquid honey having a water content below 18% by weight, and
   (c) removing said dried honey.

7. The process of claim 6 conducted in a batch mode.

8. The process of claim 6 conducted in a continuous mode.

9. The process of claim 6 wherein said contacting is conducted in a rotating disc contactor.

* * * * *